(12) United States Patent
Nemeth et al.

(10) Patent No.: US 7,354,461 B2
(45) Date of Patent: Apr. 8, 2008

(54) SOLID FUELS FOR FUEL CELLS

(75) Inventors: Laszlo T. Nemeth, Palatine, IL (US);
Anil R. Oroskar, Oakbrook, IL (US);
Kurt M. Vanden Bussche, Lake in the Hills, IL (US); Gavin P. Towler, Barrington, IL (US); Rusty M. Pittman, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 452 days.

(21) Appl. No.: 10/680,473

(22) Filed: Oct. 7, 2003

(65) Prior Publication Data
US 2005/0034357 A1    Feb. 17, 2005

Related U.S. Application Data

(60) Provisional application No. 60/451,314, filed on Feb. 28, 2003.

(51) Int. Cl.
*C10L 1/18* (2006.01)
*C10L 7/00* (2006.01)

(52) U.S. Cl. .................. 44/265; 44/266; 44/267; 44/457; 44/445; 44/397; 44/393

(58) Field of Classification Search .............. 44/265, 44/266, 267, 457, 445, 397, 393
See application file for complete search history.

(56) References Cited

U.S. PATENT DOCUMENTS 3,183,068 A * 5/1965 Monick .............. 44/266
3,964,880 A * 6/1976 Siegrist .............. 44/267
4,716,859 A    1/1988 Konig et al. .......... 123/3
5,582,001 A * 12/1996 Bradford et al. ........ 60/251
5,599,638 A    2/1997 Surampudi et al. ...... 429/33
6,057,051 A    5/2000 Uchida et al. .......... 429/19
6,238,815 B1    5/2001 Skala et al. ........... 429/17
6,248,460 B1    6/2001 Surampudi et al. ...... 429/15
6,251,349 B1    6/2001 Zaluska et al. ........ 423/286
6,267,229 B1    7/2001 Heung .............. 206/0.7
6,277,330 B1    8/2001 Liu et al. ............ 422/82.05
6,458,340 B1 * 10/2002 Ibsen et al. ........... 424/53
6,459,231 B1    10/2002 Kagatani ............ 320/101
6,514,478 B2    2/2003 Zaluska et al. ........ 423/644
6,554,877 B2 * 4/2003 Finkelshtain et al. ..... 44/436

FOREIGN PATENT DOCUMENTS

WO    WO 2004/093229 A2    10/2004

OTHER PUBLICATIONS

Patent Abstracts of Japan vol. 014, No. 546 (E-1008), Dec. 4, 1990 & JP 02 234358 A (Nippon Soken Inc), Sep. 17, 1990.
Noveon Inc Et Al: "Methanol Solid Fuel Gel/Fire Starter" Noveon Inc, 2001, XP002315679 Noveon, Inc, Cleveland.

* cited by examiner

*Primary Examiner*—Cephia D. Toomer
(74) *Attorney, Agent, or Firm*—Arthur E Gooding (57) ABSTRACT

A solid fuel for use in fuel cells is presented. The solid fuel includes solid oxygenates, and mixtures for generating a gaseous fuel from the solid fuel. The solid fuel can be contained in a cartridge and reacted with a liquid reactant for generating a gaseous fuel used in the fuel cell.

8 Claims, 12 Drawing Sheets

Stability Study

FIG. 12

US 7,354,461 B2

SOLID FUELS FOR FUEL CELLS

CROSS REFERENCE TO RELATED APPLICATIONS

This application claims priority from U.S. Provisional Application No. 60/451,314, filed Feb. 28, 2003, which is incorporated by reference in its entirety.

FIELD OF THE INVENTION

The invention relates to fuel cells. Specifically, the invention relates to solid fuels for use in energy devices for the direct generation of electricity.

BACKGROUND OF THE INVENTION

Fuel cells have developed as a method of generating electricity from chemicals. Some early development focused on using hydrogen as a clean fuel source for producing power. Work has been done on the storage and generation of hydrogen for use in fuel cells and is disclosed in U.S. Pat. Nos. 6,057,051, 6,267,229, 6,251,349, 6,459,231, and 6,514,478, all of which are incorporated by reference. Hydrogen is a high energy, low pollution fuel, however, the storage of this fuel is cumbersome, both from an energy density and safety point of view.

The difficulty of storing hydrogen has led to looking at the generation of hydrogen from more useful fuels. Liquid fuels containing a relatively high amount of hydrogen that can be generated through reforming have received significant attention. Reforming of a fuel is expensive, and adds significantly to the complexity and size of a unit using fuel cells for power generation. Reformers and methods of reforming liquid fuels have been developed, as shown in U.S. Pat. Nos. 4,716,859, 6,238,815, and 6,277,330, all of which are incorporated by reference. Therefore, there is significant interest in fuel cells that can use a hydrogen rich fuel that can be processed directly over a fuel cell electrode. This separates the fuel cells into two general categories: an indirect or reformer fuel cell wherein a fuel, usually an organic fuel, is reformed and processed to produce a hydrogen rich, and substantially carbon monoxide (CO) free feed stream to the fuel cell; and a direct oxidation fuel cell wherein an organic fuel is directly fed to the fuel cell and oxidized without any chemical reforming. Direct oxidation fuel cells can use either a liquid feed design or a vapor feed design, and preferably the fuels, after oxidation in the fuel cell, yield clean combustion products like water and carbon dioxide ($CO_2$).

In early development of direct methanol fuel cells (DMFC), using gaseous methanol required a high heat, which brought about the degradation of the fuel cell membranes. This led to the development of DMFCs using methanol in the liquid phase, as shown in U.S. Pat. Nos. 5,599,638, and 6,248,460, and which are incorporated by reference. However, the liquid phase presents drawbacks also, not the least of which is cross over of the membrane by the methanol and contamination of the cathode.

As with vapor phase fuel cells, liquid phase fuel cells also have handling problems. Specific problems include the orientation of the fuel cells or portable devices such that liquid fuel can flow out of openings for releasing waste gases, and liquid fuel cells have the problem of the high concentration of liquid methanol permeating through to be oxidized at the cathode which reduces fuel cell efficiency.

SUMMARY OF THE INVENTION

The present invention is a solid fuel for use in a fuel cell. The solid fuel comprises a solid oxygenate that is selected from metal oxygenates, gelled oxygenates, and frozen oxygenates. The invention particularly includes as a solid fuel a mixture of an oxygenate, such as methanol or acetaldehyde, and a polymer, such as an acrylic polymer in amounts necessary to produce a solid gel.

In one embodiment, the invention comprises the addition of a metal or metal compound wherein the metal is selected from the group consisting of alkali metals, alkaline earth metals, and mixtures thereof. In particular, the preferred metal compounds include magnesium compounds such as magnesium hydroxide, magnesium oxide, magnesium methoxide, magnesium hydride, and mixtures thereof. A preferred metal is magnesium. The metal compounds enhance the behavior of the oxygenates, and provide for a material to adsorb carbon dioxide generated at the anode.

In another embodiment, the invention comprises the addition of an oxidizing agent. The oxidizing agent is selected from the group consisting of sodium percarbonate, carbamide hydrogen peroxide, organic peroxides, calcium peroxide, magnesium peroxide, and mixtures thereof. The addition of oxidizing agents enhances the power density of the fuel in a direct methanol fuel cell.

Other objects, advantages and applications of the present invention will become apparent to those skilled in the art from the following detailed description.

DETAILED DESCRIPTION OF THE INVENTION

The present invention comprises a new fuel for use in a fuel cell. The new fuels are solid fuels and are not restricted to the type of fuel cells they can be used in, and can include proton exchange membrane (PEM) fuel cells, solid oxide fuel cells (SOFC), phosphoric acid fuel cells (PAFC), direct methanol fuel cells (DMFC), molten carbonate fuel cells (MCFC), and alkaline fuel cells (AFC).

To overcome drawbacks to liquid fuel cells, alternate methods of handling a liquid fuel have been developed. These include binding the liquid fuel in a non-fluid state, wherein when the fuel is needed, the fuel is recovered in a fluid state, as presented in U.S. Pat. No. 4,493,878, which is incorporated by reference. This still has the drawbacks of a liquid fuel in that the cathode efficiency is reduced from the permeation of the liquid fuel through the anode. Methanol crossover through the membrane causes a partial shorting of the cell, leading to a lower potential. Membrane development to mitigate this diffusion process is ongoing. In the meantime, concentrations of methanol are typically limited to 1-2 moles/l, i.e. 7 wt %. This results in a quick fall off in the current-voltage (I-V) curve, significant parasitic power loss for pump arounds, and a relatively large amount of processing steps and fuel cell components for anode feed conditioning.

What is needed is a fuel that is easier to handle and readily generates a gaseous component for use in a fuel cell. The solid fuel provides greater energy density and ease of handling. A solid fuel allows for convenient loading, removal, and replacement into a fuel cell. A solid fuel reduces risk of leaks and spills, as can occur with liquid or gaseous fuels. And a solid fuel allows for lighter containers than would be available for gaseous fuels. In addition, as a solid, the orientation of the fuel cell is irrelevant, as the fuel after loading into a fuel cell does not move independently, and will maintain a fixed position relative to the anode. The fuel can be any solid chemical that generates an appropriate fuel, such as an oxygenate or hydrogen for direct oxidation at the fuel cell anode. The fuel is comprised of a mixture of fuel components, and the fuel components are any chemical compounds that are added to the fuel mixture. An oxygenate is a hydrocarbon compound that has been altered with the addition of at least one oxygen atom to the hydrocarbon compound. Oxygenates include, but are not limited to, alcohols, diols, triols, aldehydes, ethers, ketones, diketones, esters, carbonates, dicarbonates, oxalates, organic acids, sugars, and mixtures thereof. Upon reaction of the solid oxygenate, a gaseous oxygenate such as methanol is produced for reaction in the fuel cell.

One preferred group of oxygenates is metal alkoxides, that react with water to generate an oxygenate in a vapor phase for reaction at the anode of the fuel cell. By generating the oxygenate in the gas phase, the fuel overcomes limitations due to the liquid phase fuel cells wherein the liquid fuel overloads the fuel cell and permeates through to the cathode. Preferred metal oxygenates include metal alkoxides. Appropriate metals include, but are not limited to, alkali and alkaline earth metals, and are selected from lithium (Li), sodium (Na), potassium (K), beryllium (Be), magnesium (Mg), and calcium (Ca). Other appropriate metals include rubidium (Rb), cesium (Cs), strontium (Sr), barium (Ba), and aluminum (Al). The oxygenate produced for use in the fuel cell preferably has a boiling point of less than 100° C. Preferably oxygenates include low molecular weight alcohols, aldehydes, organic acids, and ethers.

Alkali alkoxides, and in particular alkali methoxides and ethoxides, are very reactive and pyrophoric materials. Adding water produces a vigorous reaction and heat sufficient to vaporize the alcohol generated from the reaction.

A particular alkoxide studied was lithium methoxide (LiOCH$_3$). Lithium methoxide reacts with water to generate lithium hydroxide and methanol, with sufficient heat to generate the methanol in the vapor phase, as shown in equation 1.

$$LiOCH_3(s)+H_2O(g) \rightarrow LiOH(s)+HOCH_3(g) \qquad \text{eqn. 1.}$$

Figure 1:
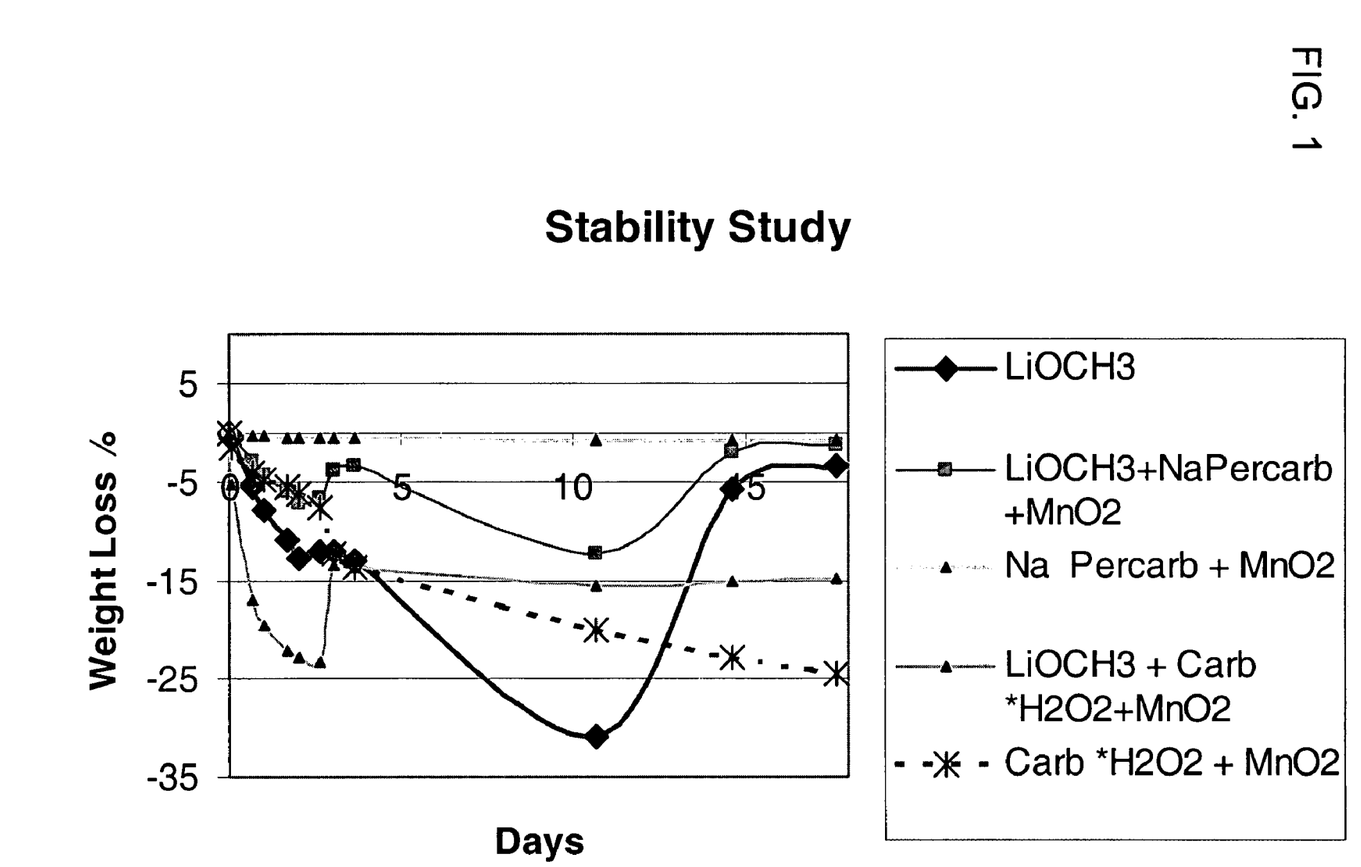
FIG. 1 shows the stability of several chemical compounds and mixtures.

The stability of lithium methoxide was studied, along with the stability of several oxidants. The experiment was carried out at room temperature in air saturated with water. Samples were weighed over time. It was found that the samples underwent a weight loss and subsequent weight gain, with the results shown in FIG. 1. Without being bound to a particular theory, it is believed that the solid fuel (lithium methoxide) reacts with the water vapor generating methanol and subsequently lose weight. The subsequent weight gain is due to the reaction of the lithium hydroxide with carbon dioxide in the air forming a carbonate, as in equation 2.

$$2LiOH(s)+CO_2(g) \rightarrow Li_2CO_3(s)+H_2O \qquad \text{eqn. 2.}$$

The fuel should be sealed in a container that is moisture impermeable to prevent consumption of the fuel through exposure to the atmosphere. The fuel container is opened when in use, but sealed against the anode forming a compartment closed to the atmosphere. This is to prevent loss of fuel, as well as to prevent excess moisture affecting the fuel. The fuel consumption is therefore controlled by moisture allowed into the compartment.

Additional compositions were studied, showing similar results in weight losses and gains in FIG. 1, and are listed in Table 1. Some of the test fuels included a small amount of catalyst, MnO$_2$, to facilitate the decomposition of an exothermic reactant. The exothermic reactant generates heat to vaporize the fuel.

TABLE 1

| Solid Fuel 1 | Lithium Methoxide (LiOCH$_3$) |
| Solid Fuel 2 | LiOCH$_3$ + Sodium percarbonate + MnO$_2$ |
| Solid Fuel 3 | Sodium Percarbonate + MnO$_2$ |
| Solid Fuel 4 | LiOCH$_3$ + Carbamide*H$_2$O$_2$ + MnO$_2$ |
| Solid Fuel 5 | Carbamide*H$_2$O$_2$ + MnO$_2$ |

This leads to the further theory of using a solid fuel to be activated by exposure to water, including in the vapor phase, generating fuel and heat and subsequently absorbing waste gases to form a solid phase. Other activation means include, but are not limited to, the application of heat, application of electrical current and exposure to carbon dioxide. As the fuel reacts at the anode, waste gases are generated. For example, methanol reacts at the anode and generates carbon dioxide and water in addition to the electricity generated during the reaction, according to equation 3.

$$CH_3OH+1.5O_2 \rightarrow 2H_2O+CO_2+\text{electricity} \qquad \text{eqn. 3.}$$

The carbon dioxide is a waste gas that must be disposed of in some manner. With the present invention, the carbon dioxide reacts with the fuel waste product, such as a metal hydroxide, and forms a solid. A preferred fuel will contain components that absorb, or react with the waste gases from the fuel cell. Fuel components may include but are not limited to, metal oxides and metal hydroxides. The waste gases are reacted to form a solid product, or are absorbed onto a solid. The primary waste gases for a direct methanol fuel cell are carbon dioxide and water. The water will react with the fuel to form more oxygenate in the vapor phase. When the fuel is metal alkoxide, where the metal is an alkali or alkaline earth metal, the metal will form a hydroxide reacting with water to give up the alcohol. The metal hydroxide will subsequently react with the carbon dioxide generated at the anode and remove the carbon dioxide from the gas phase to form a carbonate solid product.

Other preferred fuels included gelled oxygenates and frozen oxygenates. The gelled oxygenates are oxygenates that have a polymer added to form a solid. One example of a gelled oxygenate comprises a mixture of 5 wt. % of Carbopol™ 981 polymer and 95 wt. % of methanol. Carbopol 981 is an acrylic polymer made by B.F. Goodrich of Akron, Ohio. The gelled oxygenate when heated releases the methanol, which is vaporized and available for use at the anode. The oxygenate in the solid fuel comprises at least 30% by weight of the fuel, and preferably at least 50% by weight. For gelled or frozen oxygenates, the fuel comprises additional compounds for absorbing waste gases from the anode. Additional fuel components for gelled and frozen oxygenates include metals, metal oxides, metal hydroxides, or metal hydrides. Preferably the metals, metal oxides, metal hydroxides, and metal hydrides comprise alkali or alkaline earth metals. The additional components provide heat to vaporize the oxygenates and provide components for removing anode waste gases through absorption or reaction to form solid waste products.

Additional materials added to the solid oxygenates include hydroreactive materials for generating heat upon the addition of water. Preferably the materials contribute additional fuel, such as hydrogen, and/or peroxide for adsorption of carbon dioxide. Preferred materials include metal hydrides, such as lithium hydride, magnesium hydride, sodium hydride, potassium hydride, aluminum hydride, and mixtures thereof.

Solid fuels can be formed by using selected chemicals to polymerize an organic solution to gel the organic compound. The polymerizing chemicals comprise at least 3% by weight of the solid fuel. Chemicals for forming the gel include, but are not limited to, acrylic acid/acrylic amide based polymers, copolymers of polyols, ethylene/acrylic acid copolymers with amine emulsifiers, carboxyl vinyl polymers, polyacrylic acid polymers, olefin-maleic anhydride copolymers, and copolymers of oligomers containing OH groups with formaldehyde. The copolymers of oligomers containing OH groups include high melting point alcohols, i.e. alcohols having 12 or more carbons; high melting point glycols; high melting point hydrocarbons; sugar esters, i.e., Sorbitan Monostearate (S-MAZ 60); and alkali alkoxides. Additional polymerizing materials can be found in U.S. Pat. Nos. 3,759,674; 3,148,958; 3,214,252; 4,261,700; and 4,865,971, all of which are incorporated by reference in their entirety.

Figure 2:
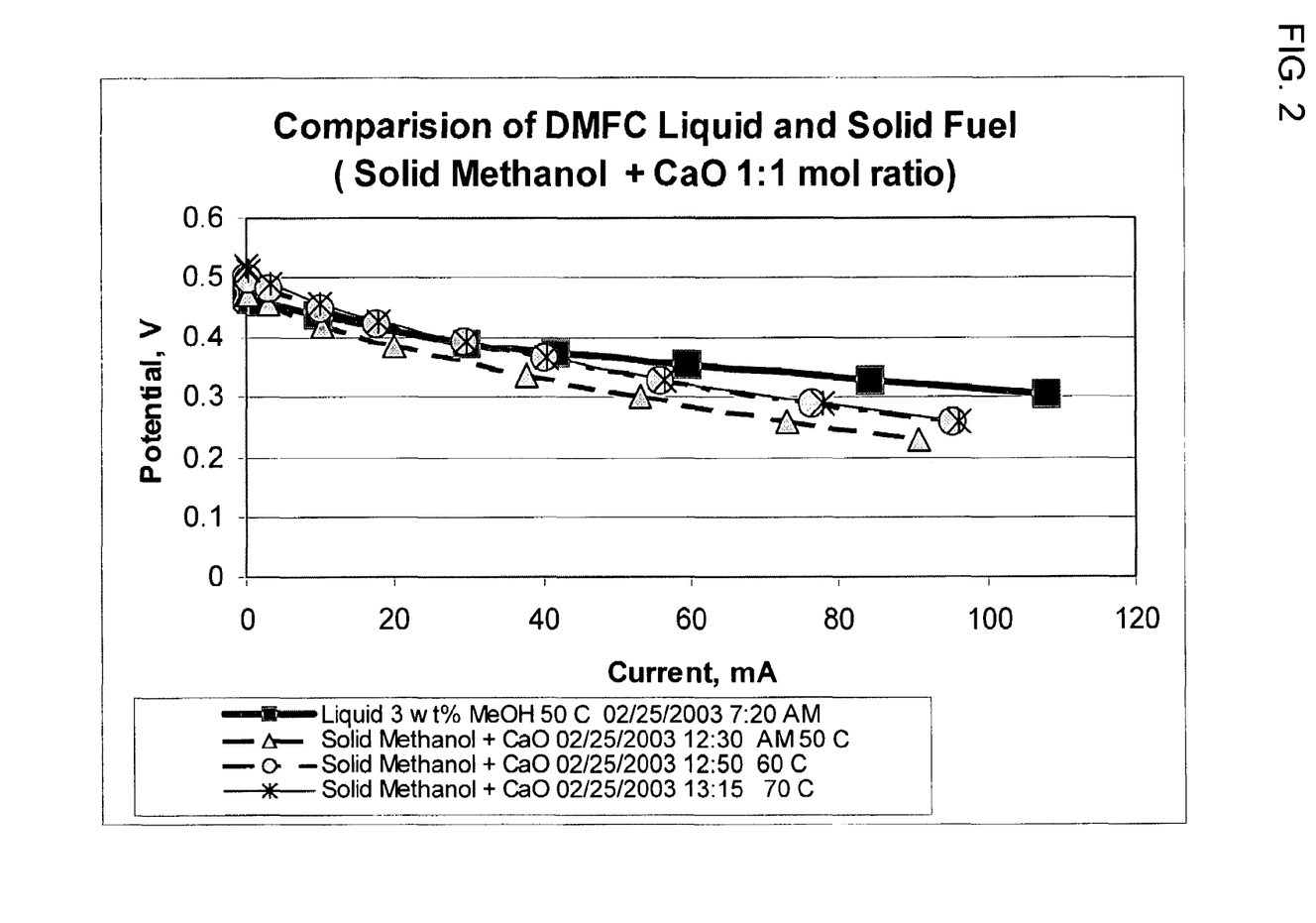
FIG. 2 shows a comparison of DMFC liquid and solid fuel.
Figure 3:
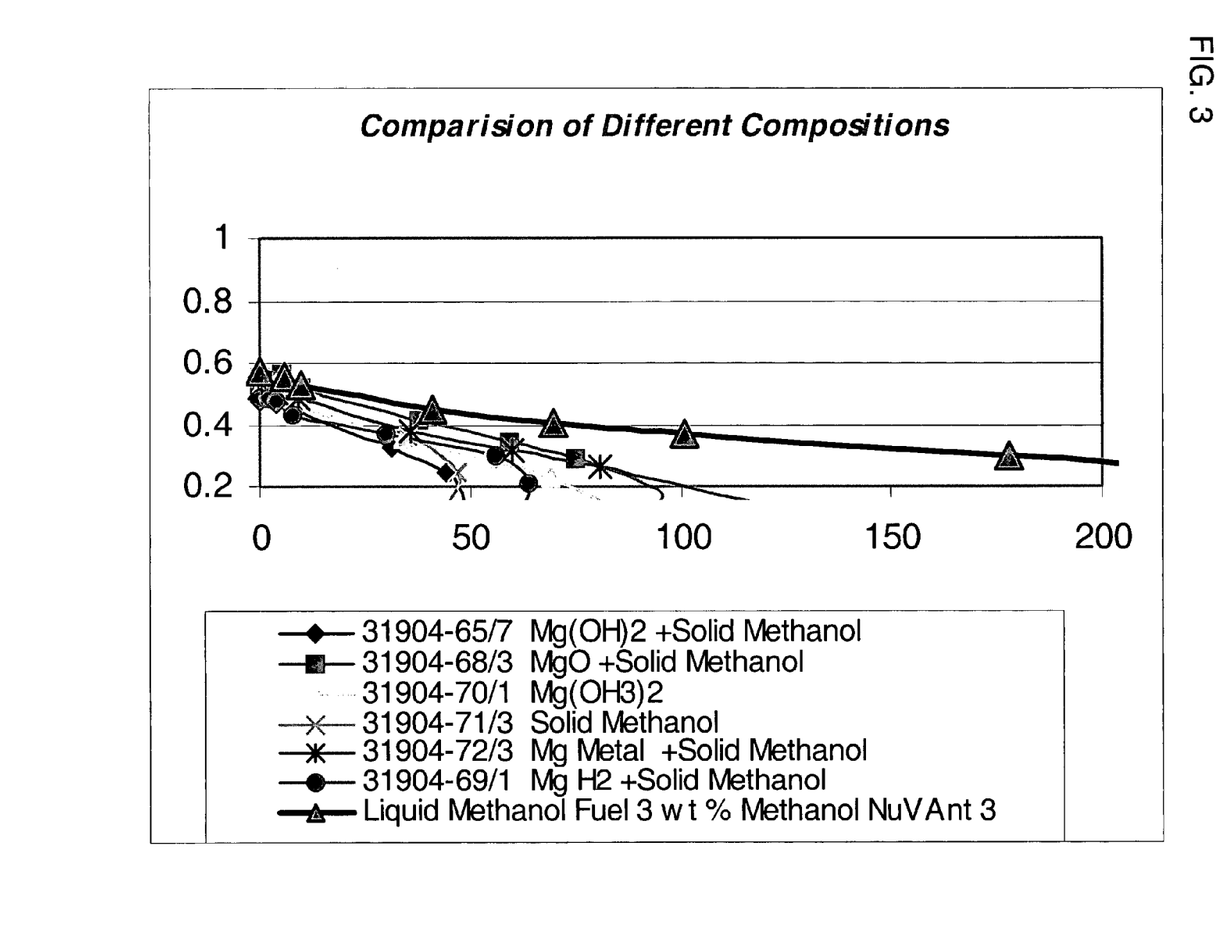
FIGS. 3 and 4 show comparisons of current against cell potential for different compositions of solid fuels and liquid methanol.
Figure 4:
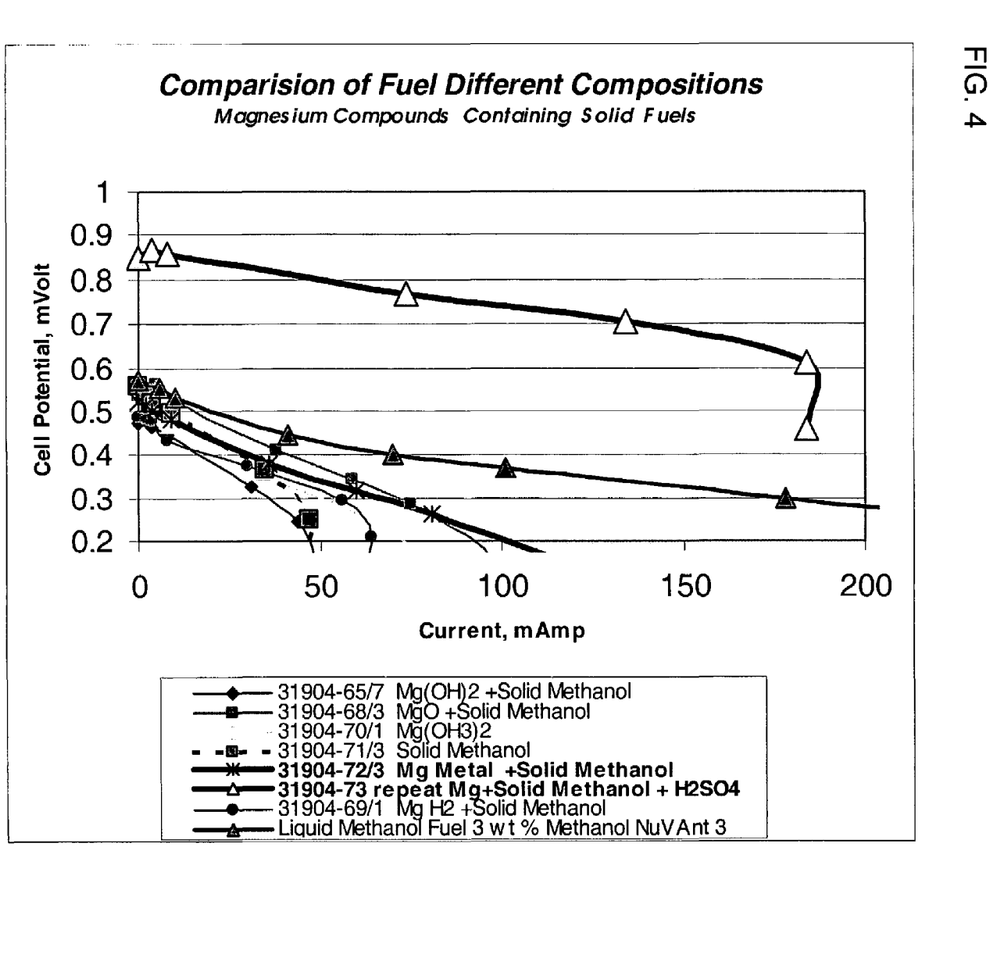
Figure 5:
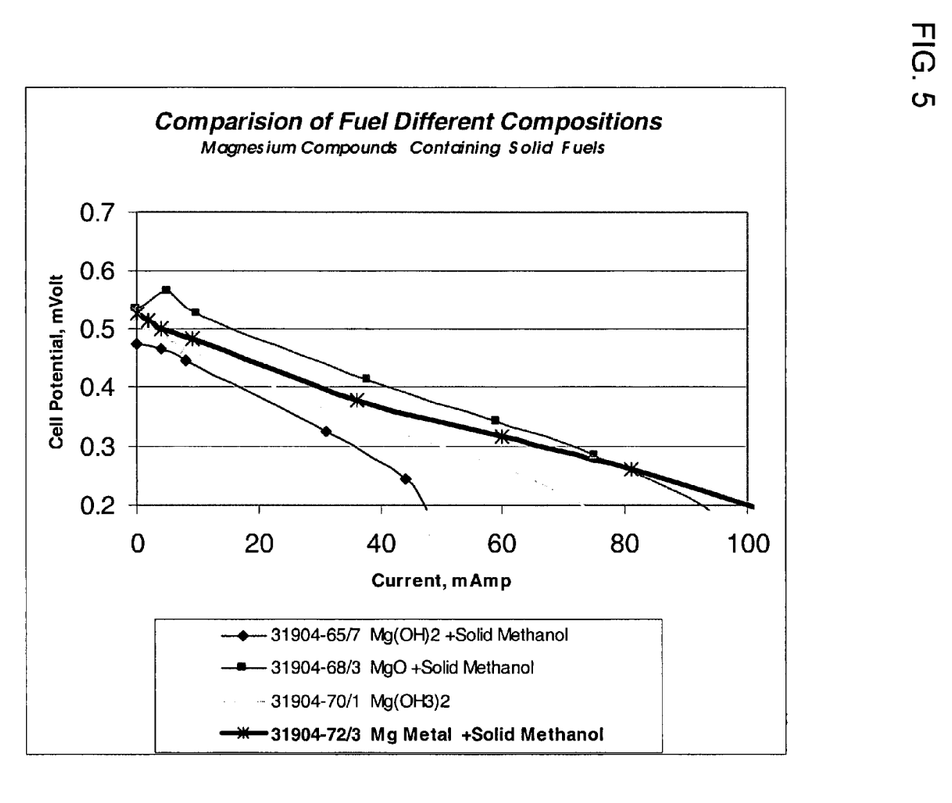
FIGS. 5 and 6 show comparisons of current against cell potential for different compositions of solid fuels.
Figure 6:
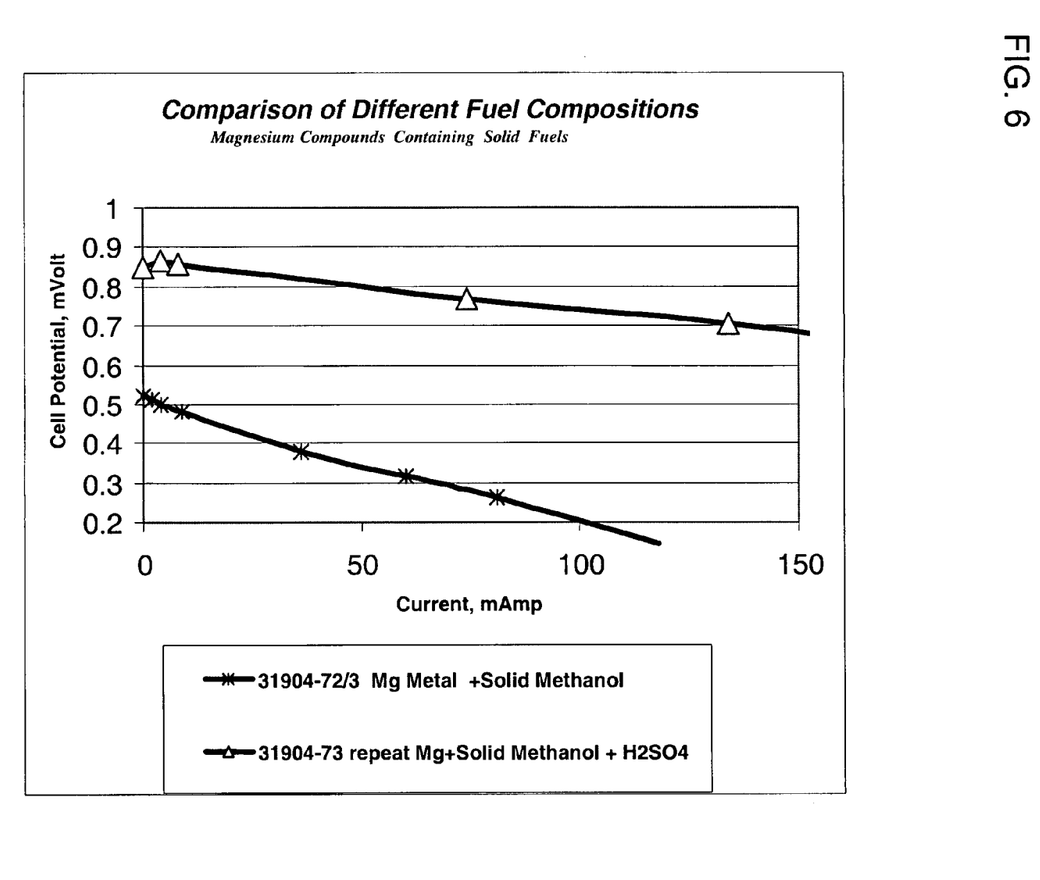

A study of a particular gelled fuel was done to demonstrate the use of a gelled fuel. The fuel comprised methanol, calcium oxide (CaO), and Carbopol 981 polymer with a ratio of 32:56:5 respectively. The fuel was loaded into a DMFC and the fuel cell was run. The fuel cell generated an I-V curve for comparison with an aqueous methanol fuel at different temperatures, and at ambient pressure. FIG. 2 shows the results of the I-V curve for comparison with a liquid fuel.

The composition of fuel can be adjusted to compensate for additional water generated or absorbed by the fuel, and additional heat necessary to ensure vaporization of the fuel when exposed to moisture. Additional heat can be generated by using chemicals that have very exothermic reactions upon addition of water or an appropriate chemical that generates heat upon decomposition. Examples of appropriate chemicals include, but are not limited to, organic peroxides, and carbamide hydrogen peroxide. The fuel composition can also be adjusted by using a combination of the above mentioned fuels, for example, mixing a metal hydride with a metal oxygenate to form a fuel that will generate hydrogen and an alcohol for reaction at the fuel cell anode. Alternate mixtures might include additional metal hydroxides for more rapid reaction of carbon dioxide generated at the anode.

The usefulness and desirability of lithium compounds is tempered by lithium's expense. Lithium and lithium compounds are much more expensive than other alkali or alkaline earth metals and their compounds. Further studies seeking appropriate compounds included using a variety of magnesium compounds. The compositions of some of the mixtures tested are listed in Table 2.

TABLE 2

Chemical composition of Solid Methanol Fuels using Magnesium Compounds as Additives

| Fuel I.D. # | Mg compounds, wt % | Solid Methanol wt % | Comment |
| --- | --- | --- | --- |
| 1 | $Mg(OH)_2$, 64.36 | 35.64 | Solid paste |
| 2 | MgO, 56 | 44 | Solid paste |
| 3 | $Mg(OCH_3)_2$, 100 | 0 | Solid crystal |
| 4 | Mg, 42.2 | 57.6 | Solid paste |

The tests involved using magnesium compounds either alone, as in the case of magnesium methoxide ($Mg(OCH_3)_2$), or as a mixture with solid methanol. The solid methanol comprised a mixture of methanol and Carbopol 981. FIGS. 3-6 show the results of tests using magnesium or various magnesium compounds with solid methanol in fuel cells. The magnesium compounds include, but are not limited to, magnesium hydroxide ($Mg(OH)_2$), magnesium oxide (MgO), magnesium methoxide ($Mg(OCH_3)_2$), and magnesium hydride ($MgH_2$). The figures present the I-V, or current vs. potential, curves measured for various compositions. In the tests a small amount of water was added to create humidity in the anode chamber. The reactions of the solid fuel are initiated with a small amount of humidity, and then can be self generating as the reaction at the anode generates moisture. The magnesium compounds also adsorb the carbon dioxide ($CO_2$) generated at the anode when the methanol reacts to generate an electrical current.

Figure 7:
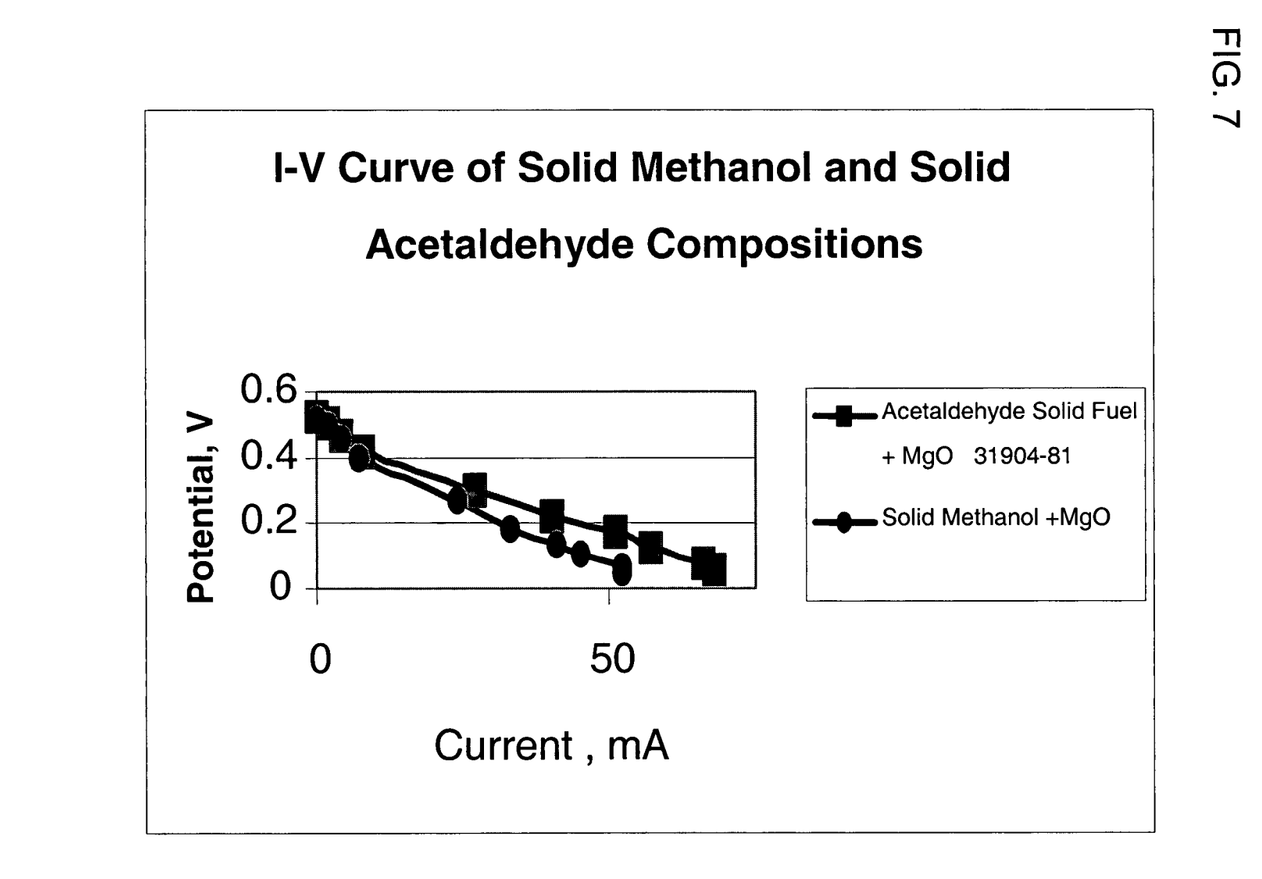
FIG. 7 shows a comparison of solid acetaldehyde fuel and solid methanol fuel.

An alternate solid fuel studied was acetaldehyde solid fuel. The fuel comprised a mixture of 50 gm of acetaldehyde and 0.5 gm of Carbopol 981. The fuel was allowed to gel and the solid fuel was mixed with 3.2 gm of magnesium oxide. The I-V curve of solid acetaldehyde with MgO was measured and compared with the results for solid methanol with MgO. The results are shown in FIG. 7, showing an improvement over the solid methanol.

Figure 8:
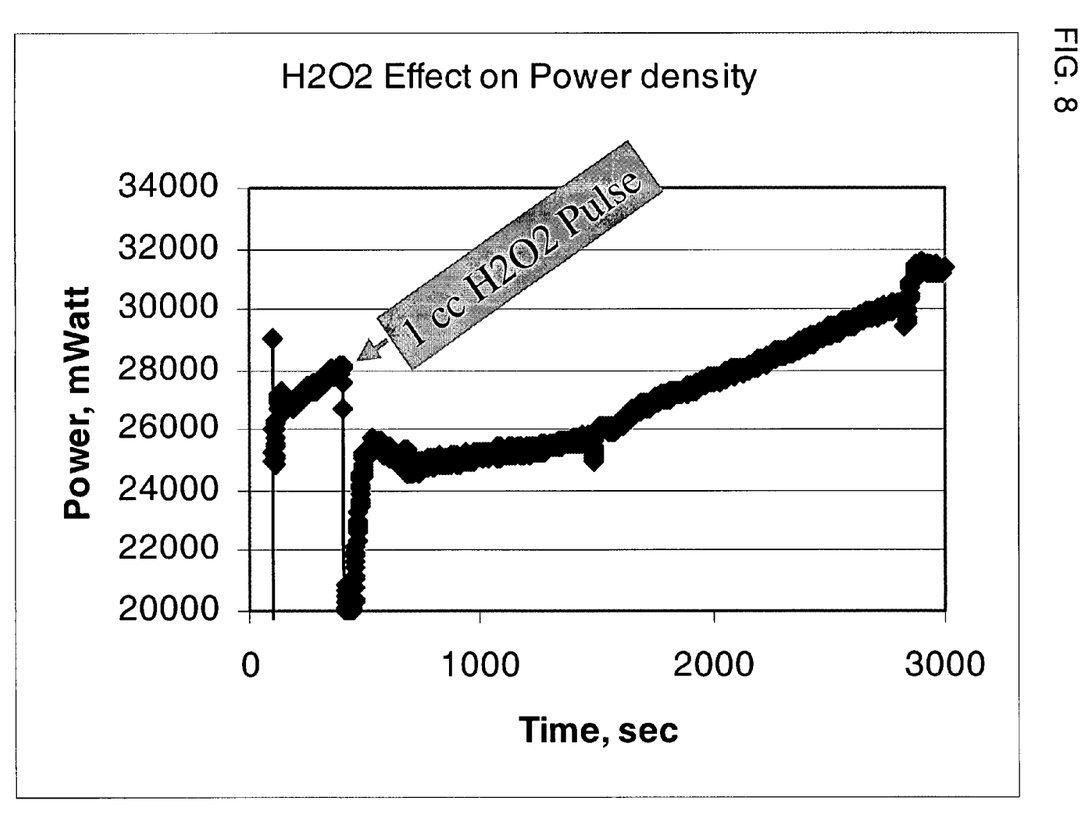
FIG. 8 shows the effect of additional oxidant added to methanol for a direct methanol fuel cell.
Figure 9:
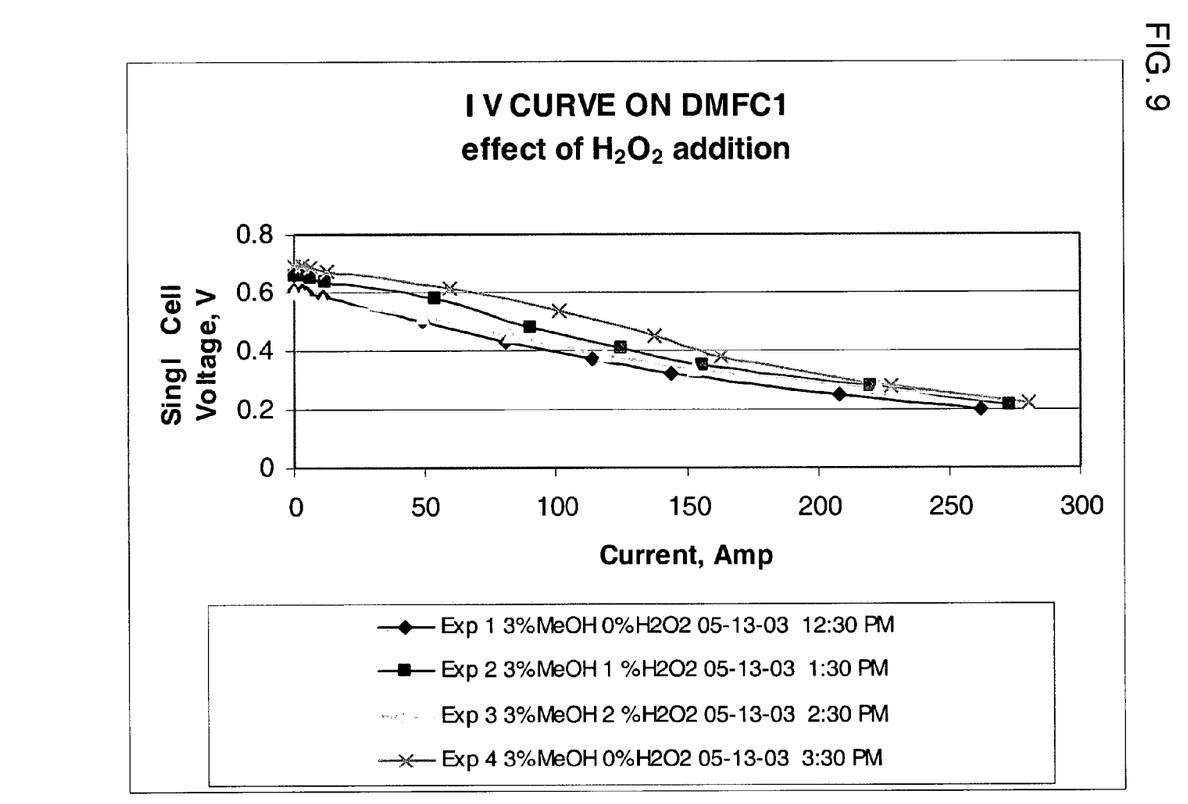
FIG. 9 shows the I-V (current-voltage) curves for different hydrogen peroxide with methanol for a direct methanol fuel cell.

In addition to the solid oxygenate fuels, it was found that performance of the fuels can be enhanced with the addition of an oxidant. Especially, an oxidant that generates hydrogen in the process of activating the fuel. Direct methanol fuel cells were studied with oxidants in pulse mode. After a pulse of oxidant, in this case hydrogen peroxide ($H_2O_2$), was added, the fuel cell exhibited a dilution effect, but then there was an increase in the power density, as can be seen in FIG. 8. There was an ultimate improvement of 14% in the power density. Hydrogen peroxide solutions from 1 to 3 weight percent were added to 3 weight percent methanol solutions, and the I-V curves were measured. An improvement was found in the I-V curves by the addition of an oxidant to the methanol as shown in FIG. 9. For hydrogen peroxide, the addition of a 2 weight percent solution showed the greatest improvement.

Although hydrogen peroxide is a liquid, solid oxidants having comparable behavior are available. Alternate oxidants include, but are not limited to, sodium percarbonate, carbamide hydrogen peroxide, organic peroxides, such as tert-butyl hydroperoxide (TBHP), tert-pentyl hydroperoxide, etc., and alkaline earth metal peroxides such as magnesium peroxide and calcium peroxide.

Figure 10:
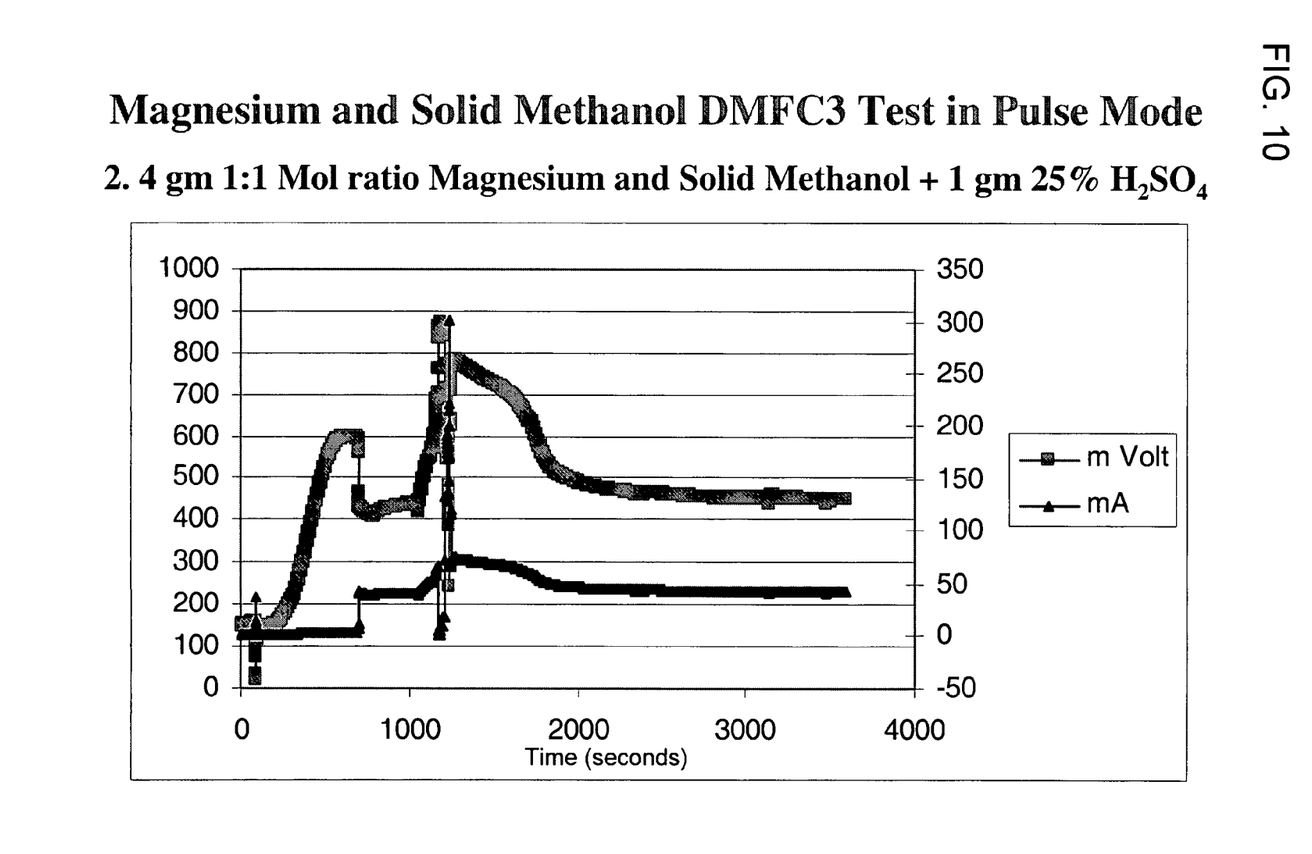
FIG. 10 shows the voltage and amperage for a fuel cell with magnesium and solid methanol with a pulse of sulfuric acid.
Figure 11:
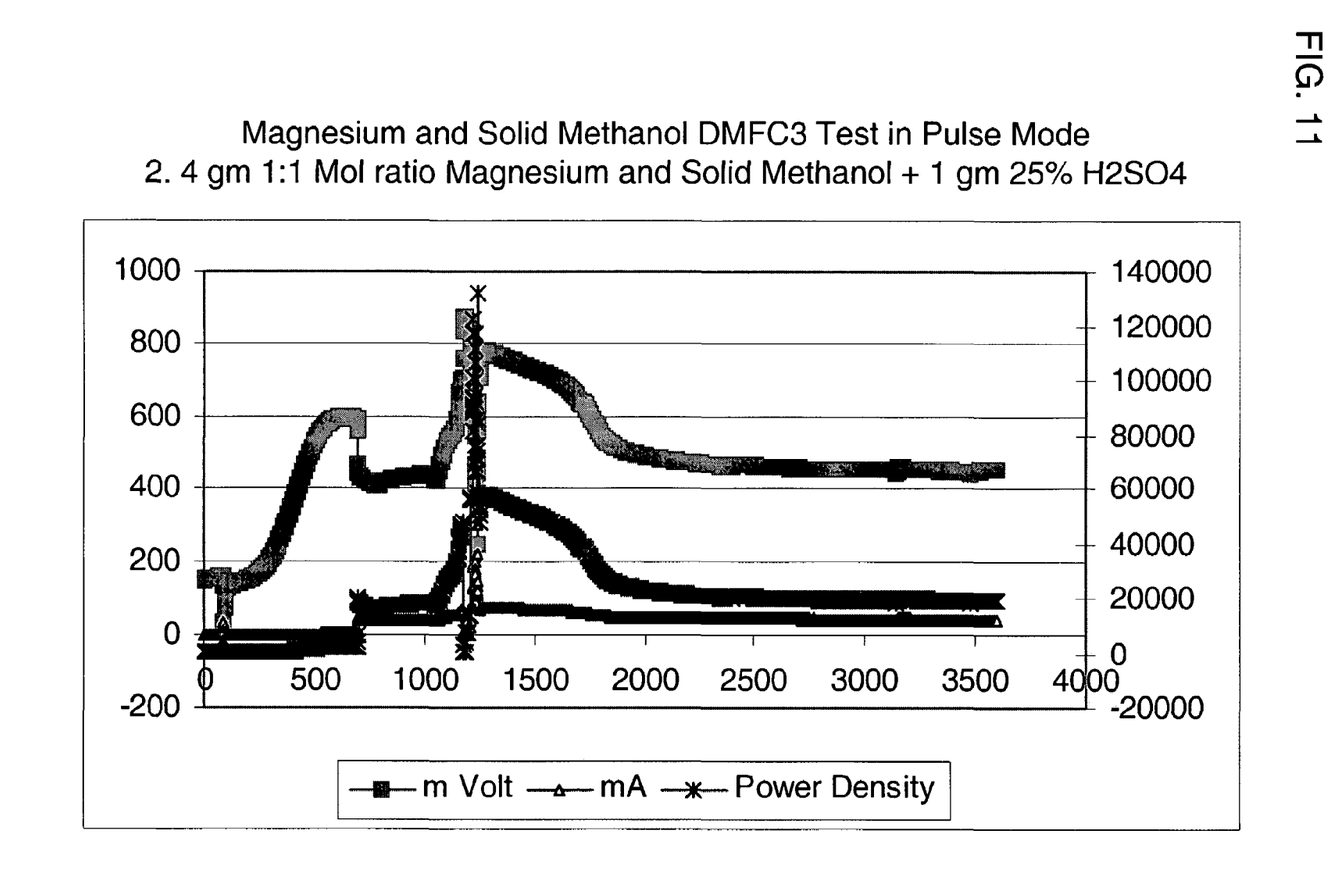
FIG. 11 shows the voltage, amperage and power density for magnesium and solid methanol in a fuel cell with a pulse of sulfuric acid.
Figure 12:
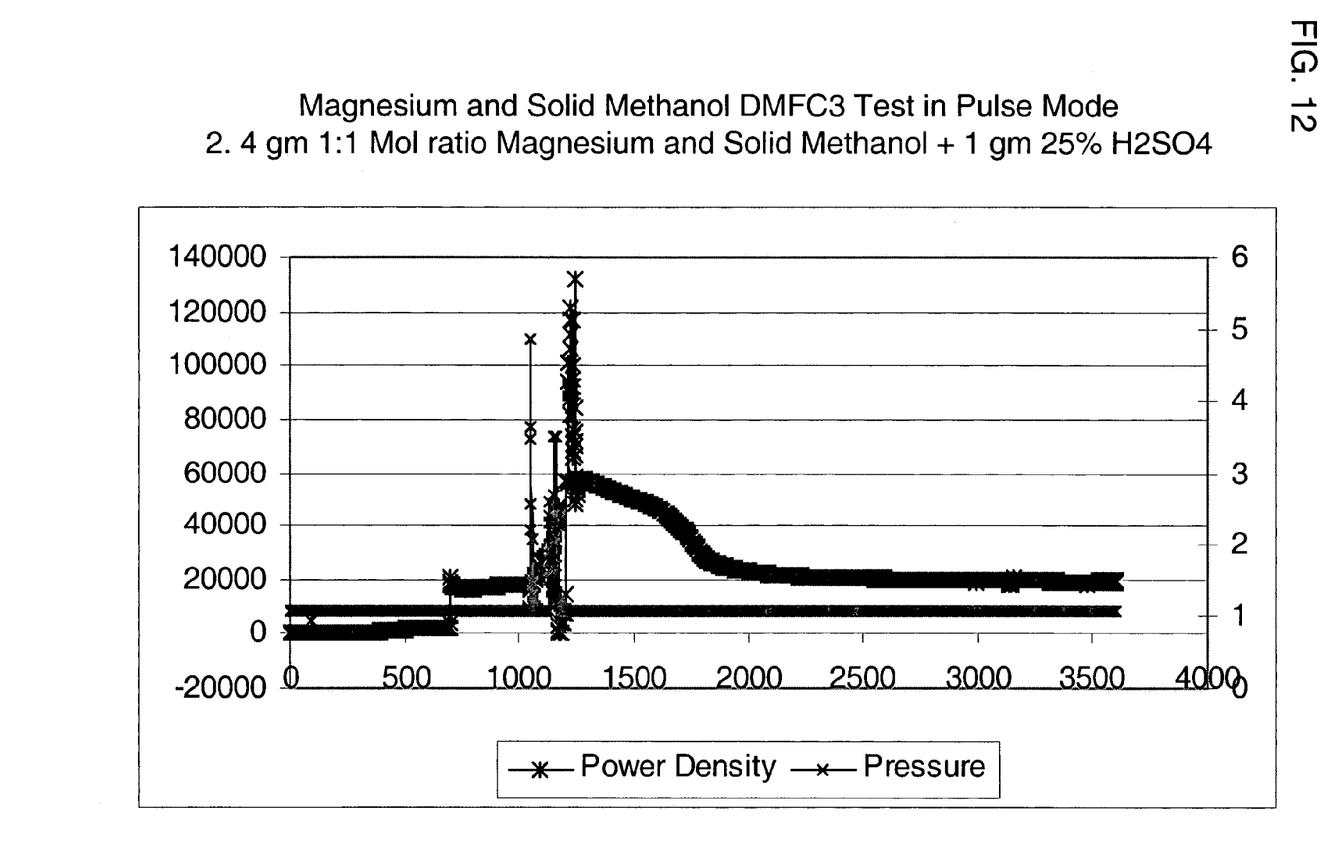
FIG. 12 shows the power density and the pressure for magnesium and solid methanol in a fuel cell with a pulse of sulfuric acid.

The addition of strong oxidizing agents has been further studied to determine the influence on power generation for direct methanol fuel cells. Tests were run in pulse mode with an injection of sulfuric acid ($H_2SO_4$) to solid methanol. The sulfuric acid addition generated additional hydrogen from the magnesium metal and improved the DMFC performance. The results shown in FIGS. 10-12, show an improvement in the power density, and increases in the pressure in the anode compartment of the fuel cell. Additional acids which can be used include, but are not limited to, hydrochloric acid (HCl), and nitric acid ($HNO_3$).

The addition of oxidizing agents improves performance and such oxidizing agents can be added in a solid form, where the oxidizing agent reacts with the solid fuel when in the presence of moisture. The control of the addition of water to the fuel can be used to control the generation of gaseous fuel for the fuel cell and allow for intermittent power generation. As an alternative, a strong liquid oxidizing agent can be held in a separate and sealed compartment for controlled addition to a solid fuel when the fuel is placed in fluid communication with the anode compartment of the fuel cell.

Another aspect with the addition of compounds such as peroxides, is the heat release when the peroxide reacts, or decomposes. The heat release facilitates the vaporization of methanol, or other organic compound that reacts at the anode of the fuel cell in a gaseous phase. The decomposition of the peroxide can be facilitated by the addition of a small amount of catalyst. The catalyst for the decomposition of the oxidizer is a compound comprising one or more metals selected from calcium (Ca), scandium (Sc), titanium (Ti), vanadium (V), chromium (Cr), manganese (Mn), iron (Fe), cobalt (Co), nickel (Ni), copper (Cu), zinc (Zn), strontium (Sr), yttrium (Y), zirconium (Zr), niobium (Nb), molybdenum (Mo), technetium (Tc), ruthenium (Ru), rhodium (Rh), palladium (Pd), silver (Ag), cadmium (Cd), barium (Ba), lanthanum (La), hafnium (Hf), tantalum (Ta), tungsten (W), rhenium (Re), osmium (Os), iridium (Ir), platinum (Pt), gold (Au), and mercury (Hg). The catalyst can include oxides of the metal, sulfides and other sulfur compounds of the metal and sols comprising the metal. Preferred catalysts comprise one or more metals from vanadium, iron, cobalt, ruthenium, copper, nickel, manganese, molybdenum, platinum, gold, silver, palladium, rhodium, rhenium, osmium, and iridium, with the more preferred catalyst comprising iron, cobalt, nickel and manganese. A more preferred compound is manganese oxide ($MnO_2$).

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A solid fuel for generating a gaseous fuel for use in a fuel cell, comprising:
    gelled oxygenates, wherein the gelled oxygenate comprises methanol in an amount of at least 30 weight percent and an acrylic polymer in an amount of at least 3 weight percent; and
    a solid oxidant, wherein the solid oxidant is selected from the group consisting of sodium percarbonate, carbamide hydrogen peroxide, organic peroxides, and mixtures thereof.

2. A solid fuel for generating a gaseous fuel for use in a fuel cell comprising:
    an oxygenate, the oxygenate comprises an acetaldehyde in an amount of at least 30 weight percent;
    a polymer, wherein the polymer is an acrylic polymer in an amount of at least 3 weight percent; and
    a metal or metal compound, wherein the metal or metal compound is selected from the group consisting of magnesium hydroxide ($Mg(OH)_2$), magnesium oxide (MgO), magnesium methoxide ($Mg(OCH_3)_2$), magnesium (Mg), magnesium hydride ($MgH_2$), and mixtures thereof.

3. A solid fuel for generating a gaseous fuel for use in a fuel cell, comprising:
    frozen oxygenates, wherein the frozen oxygenate comprises a mixture of an oxygenate and a material selected from the group consisting of alcohols, glycols, hydrocarbons, sugar esters, metal alkoxides, and mixtures thereof, having melting points at temperatures greater than 26° C.; and
    a solid oxidant, wherein the solid oxidant is selected from the group consisting of sodium percarbonate, carbamide hydrogen peroxide, organic peroxides, and mixtures thereof.

4. A solid fuel for generating a gaseous fuel for use in a fuel cell, comprising:
    metal oxygenates, wherein the metal oxygenate comprises a metal selected from the group consisting of lithium (Li), sodium (Na), potassium (K), beryllium (Be), magnesium (Mg), calcium (Ca), rubidium (Rb), cesium (Cs), strontium (Sr), barium (Ba), aluminum (Al), and mixtures thereof; and
    a solid oxidant, wherein the solid oxidant is selected from the group consisting of sodium percarbonate, carbamide hydrogen peroxide, organic peroxides, and mixtures thereof.

5. The solid fuel of claim 4 wherein the metal is selected from the group consisting of lithium, sodium, potassium, magnesium, and mixtures thereof.

6. A solid fuel for generating a gaseous fuel for use in a fuel cell, comprising:
    an oxygenate compound selected from the group consisting of metal oxygenates, gelled oxygenates, frozen oxygenates, and mixtures thereof;
    a solid oxidant, wherein the solid oxidant is selected from the group consisting of sodium percarbonate, carbamide hydrogen peroxide, organic peroxides, and mixtures thereof; and
    a solid catalyst selected from the group consisting of transition metals, oxides of transition metals, and mixtures thereof.

7. The solid fuel of claim 6 wherein the catalyst is selected from the group consisting of oxides of Mn, oxides of Fe, and mixtures thereof.

8. A solid fuel for generating a gaseous fuel for use in a fuel cell, comprising:
    an oxygenate compound selected from the group consisting of metal oxygenates, gelled oxygenates, frozen oxygenates, and mixtures thereof;
    a solid oxidant, wherein the solid oxidant is selected from the group consisting of sodium percarbonate, carbamide hydrogen peroxide, organic peroxides, and mixtures thereof; and
    a metal hydride selected from the group consisting of lithium hydride, magnesium hydride, sodium hydride, potassium hydride, aluminum hydride, and mixtures thereof.

* * * * *